United States Patent [19]
Friedenthal

[11] Patent Number: 5,220,159
[45] Date of Patent: Jun. 15, 1993

[54] REFRACTION CORRECTION FOR AXISYMMETRIC VIEWING WINDOW

[75] Inventor: Kenneth J. Friedenthal, Los Angeles, Calif.

[73] Assignee: Hughes Aircraft Company, Los Angeles, Calif.

[21] Appl. No.: 764,273

[22] Filed: Sep. 23, 1991

[51] Int. Cl.⁵ .................................................. G01J 1/20
[52] U.S. Cl. .................................. 250/201.9; 356/121
[58] Field of Search ............... 250/201.9, 203.1, 203.2; 356/121; 359/727, 708, 220, 725, 718

[56] References Cited

U.S. PATENT DOCUMENTS

| | | | |
|---|---|---|---|
| 4,016,415 | 4/1977 | O'Meara | 250/201.9 |
| 4,231,534 | 11/1980 | Lintell et al. | 250/203.2 |
| 4,864,137 | 9/1989 | Klein | 359/708 |

Primary Examiner—David C. Nelms
Assistant Examiner—Que T. Le
Attorney, Agent, or Firm—C. D. Brown; R. M. Heald; W. K. Denson-Low

[57] ABSTRACT

An axisymmetric dome (28) located between a radiation emitting target (14) and a radiation sensor (10) has an outer surface area (33) where a principal ray (16) from the target (14) impinges on the dome (28) that is parallel to the dome inner surface area (31) where the principal ray leaves the dome. This dome construction reduces image aberration in the pitch plane (Y, Z'). For correction aberration in the roll plane, a focusing reflector (31) is constructed of a piezo-electric plate (32) with a plurality of spaced apart electrodes (38) on its non-reflective surface, which reflector (31) reflects radiation from the target (14) onto a secondary reflector (20) which, in turn, reflects the radiation onto the sensor (10). Selective electrical energization of the electrodes (38) modifies the reflector (31) shape to correct roll plane aberration.

6 Claims, 2 Drawing Sheets

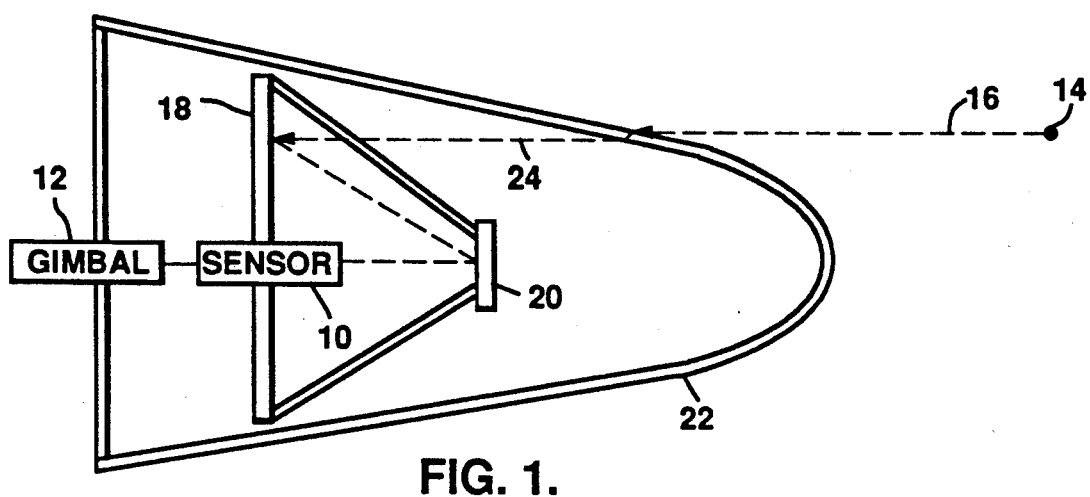
FIG. 1.
FIG. 2.
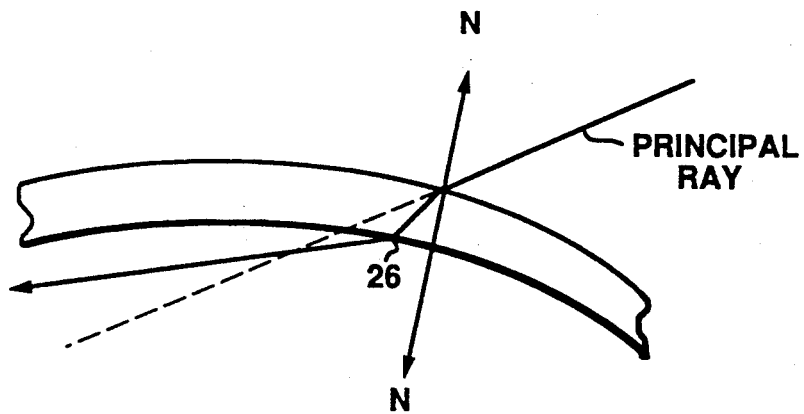
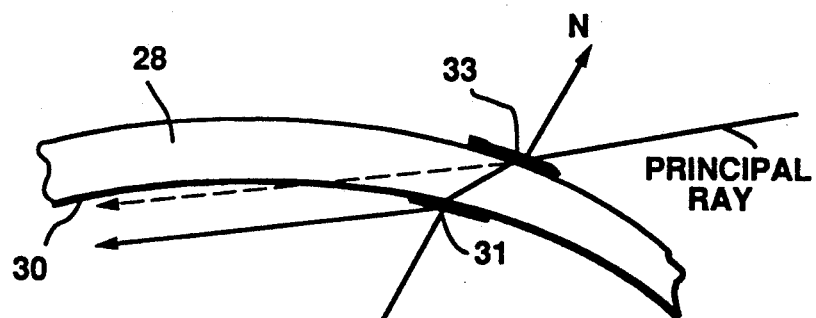
FIG. 3.

x,y,zz = INERTIAL
x',y,z' = SENSOR
ψ = ROLL
φ = PITCH

REFRACTION CORRECTION FOR AXISYMMETRIC VIEWING WINDOW

BACKGROUND OF THE INVENTION

1. Field of the Invention

The present invention pertains generally to correcting for viewing aberrations produced by electromagnetic radiation passing through a surface, and, more particularly, to correcting for refraction of radiation that has passed through an axisymmetric surface.

2. Description of Related Art

There are many situations in which electromagnetic energy (e.g., infrared light) must pass through a surface (e.g., window) before actuating other apparatus. In the control of a missile, for example, infrared energy from an external target on being sensed at the missile serves as a means for identifying and locating the target to enable guiding the missile to the target. Where the windows used have a substantial curvature to them (so-called domes), this tends to produce a prohibitively large refraction of the electromagnetic energy when the angle of radiation incidence varies significantly from 90 degrees, giving the impression to the control apparatus that the source of the energy is located at a different position than where it is in actuality.

A known technique for solving this problem at the present time is to construct the window of either a flat plate or a plate having a spherical surface. In addition, there are other approaches in which a fixed correction is built into an axisymmetric window according to an assumed direction that target information can be expected to take which, of course, means that a variable amount of error will have to be tolerated, dependent upon how different the actual target direction is from the assumed direction. The use of flat or spherical surfaces, however, produces an undesirably high aerodynamic drag if they are allowed to be exposed directly to the environment, so that if used will require a removable shroud which is positioned over the window until quite late in the missile trajectory when it is jettisoned. In the latter case, the shroud precludes use of, say, an infrared sensor at long range, and the jettison mechanism for removing the shroud involves additional weight, is awkward and restricts operation somewhat.

OBJECTS AND SUMMARY OF THE PRESENT INVENTION

It is therefore a primary aim and object of the present invention to provide means and method for reducing image distortion when radiation must pass through an axisymmetric window.

A typical optical system of a guidance or tracking system includes a curved reflector that focuses radiation from a target onto a secondary mirror and which, in turn, redirects the radiation onto a sensor. The two reflectors and sensor are gimbal mounted and servo driven to be centered on a principal ray coming from the radiation source. The system then drives the missile along the optical axis to the target. A transparent window is located in front of the two mirrors and sensor for protection of the enclosed apparatus.

Where the window between a source of radiation to be sensed (e.g., target) and the sensor, for example, is formed outwardly convex for aerodynamic purposes, incoming radiation that is angled off the normal to the window surface will tend to be refracted angularly away from the line of sight. Also, of course, the amount of refractive aberration will vary depending upon the precise location of the source and the angle that it forms with the window outer surface.

In accordance with a first embodiment of the invention, a domelike window is provided having a generally convexly curved outer surface that is also symmetric about an axis (i.e., axisymmetric), both for aerodynamic reasons and, as well, in that this makes aberration correction less complex. The inner surface of the window or dome is specially shaped so that the inner surface area at a point of principal ray exit will be parallel to the external surface area where the ray is incident. This special surface arrangement establishes correction in the "pitch" plane or Y-Z' where Z' is the new Z axis after roll has been taken into account. In this manner the refraction of the ray upon leaving the inner surface of the dome is lessened over that which it would have been subjected to in a dome of normal construction having parallel inner and outer surfaces measured along a normal through the dome material. This choice of coordinates also permits the inner surface to be circular in cross-section.

It is also necessary to correct for refractive aberration in the "roll" plane, i.e. the plane X'-Y where X' is the X axis shifted after roll is accomplished. This is accomplished in accordance with the invention by constructing the focusing reflector to be an electrically alterable element such as a piezo-electric plate. More particularly, the electrically alterable reflector includes a plurality of electrodes located behind a piezo-electric reflector and by selective energization of the electrodes the shape and curvature of the reflector are changed causing a corresponding change in reflection of incident radiation. The voltages to be applied to the various piezo-electric electrodes may be obtained from an empirical table of voltages for the electrodes determined for each pitch angle. Alternatively, the voltages may be obtained by first applying a dither on each voltage and sensing the sharpness of the image in the various regions of a scanned beam from which an adaptive scheme may be implemented.

BRIEF DESCRIPTION OF THE DRAWING

In the accompanying drawing:

FIG. 1 is a sectional elevational partially fragmentary view of a conventional curved dome enclosing a radiation sensor;

FIG. 2 is a sectional, fragmentary enlarged view of the dome material;

FIG. 3 is a side elevational, sectional partially fragmentary view of part of a dome modified in accordance with the present invention to correct for refractive aberration of light passing therethrough;

DESCRIPTION OF A PREFERRED EMBODIMENT

Figure 4:
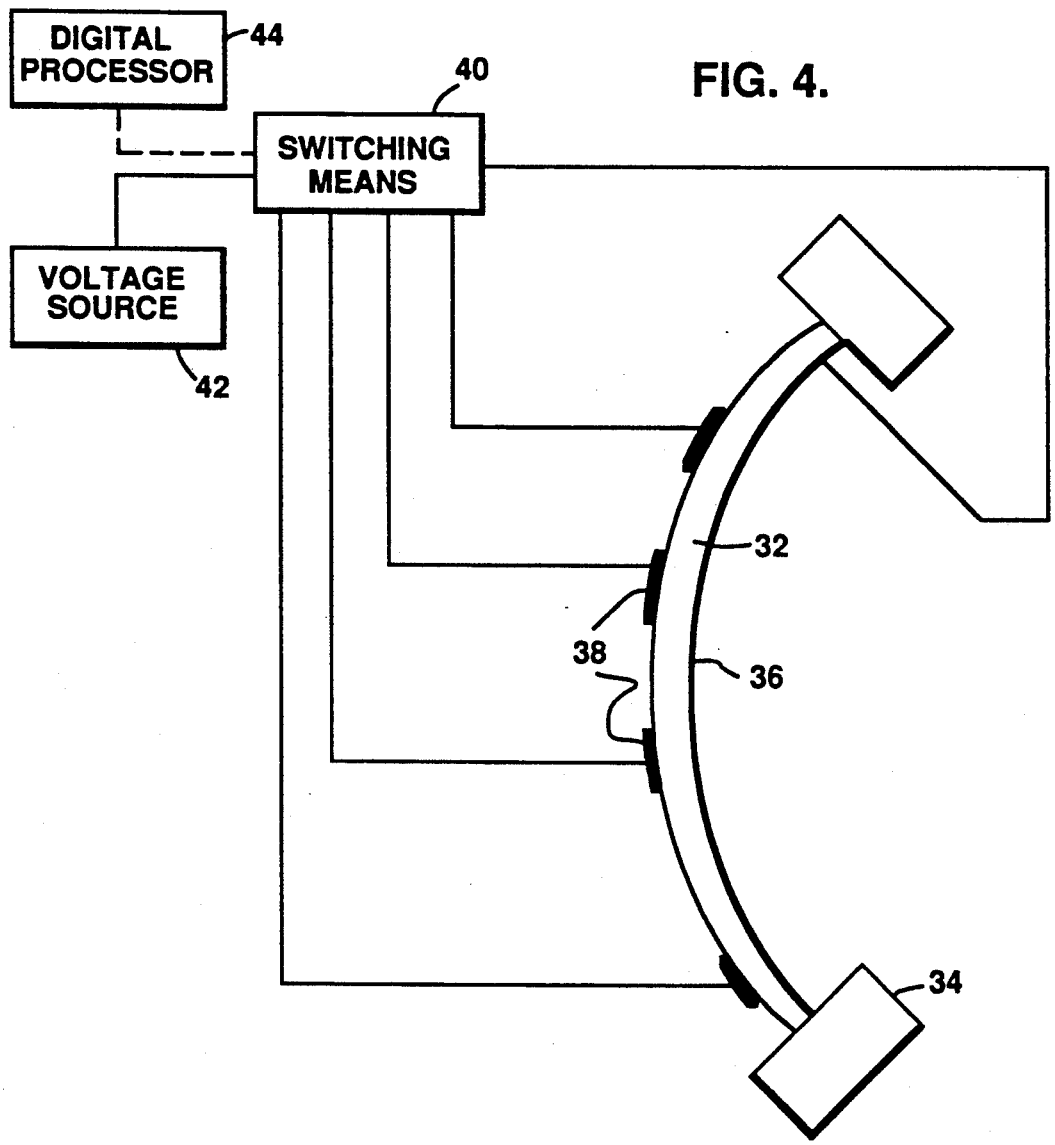
FIG. 4 shows the electrically variable reflector plate of the invention in its unenergized stage and in one stage of energization.

With reference now to the drawings and particularly FIG. 1, there is shown a radiation sensor 10 mounted on a gimbal 12 and which sensor is typically controlled, when part of a guidance system, for example, in order to be directed at a target 14 from which radiation 16 is being sensed or detected. More particularly, a principal ray 16 coming from the target 14 reflects off a focusing reflector 18 onto a secondary reflector 20 and then onto the sensor 10. By a servo drive system (not shown), the gimbal mounted sensor is aimed directly at the target and remains so oriented.

For aerodynamic reasons, it is desirable to enclose the sensor, reflectors and gimbal system within a transparent dome 22 having a specially curved outer surface to reduce drag. However, radiation coming from the target 14 along the path 16 on passing through the dome wall is refracted a certain amount dependent upon the angle of incidence and, as well, the material from which the dome is made. Accordingly, the refracted radiation beam, instead of traveling straight to the sensor along the line 16 of the principal ray moves along a refracted line 24 which is angularly displaced from the beam path 16. Of course, resetting the gimbal in order to point the sensor directly at the target will then be subject to an error depending upon the refraction or aberration of the beam passing through the dome.

Because of this error, according to one technique in the past, radiation windows have been made flat of a uniformly thick material which has the undesirable result of being detrimental to the missile aerodynamics in producing substantial drag. Also, where a flat window was used and it was desired to improve aerodynamic properties, the window was covered with a shroud having a curved outer surface prior to actual use of the window in order to reduce the amount of aerodynamic drag. Such shrouds, however, must be jettisoned before target sensing is initiated which is awkward and poses a certain amount of restriction to normal operation.

Alternatively, spherical outer surfaces have been provided on domes achieving some relief from the aerodynamic drag difficulty, but, in actuality, only providing a partial correction of image distortion resulting from refraction.

Figure 5:
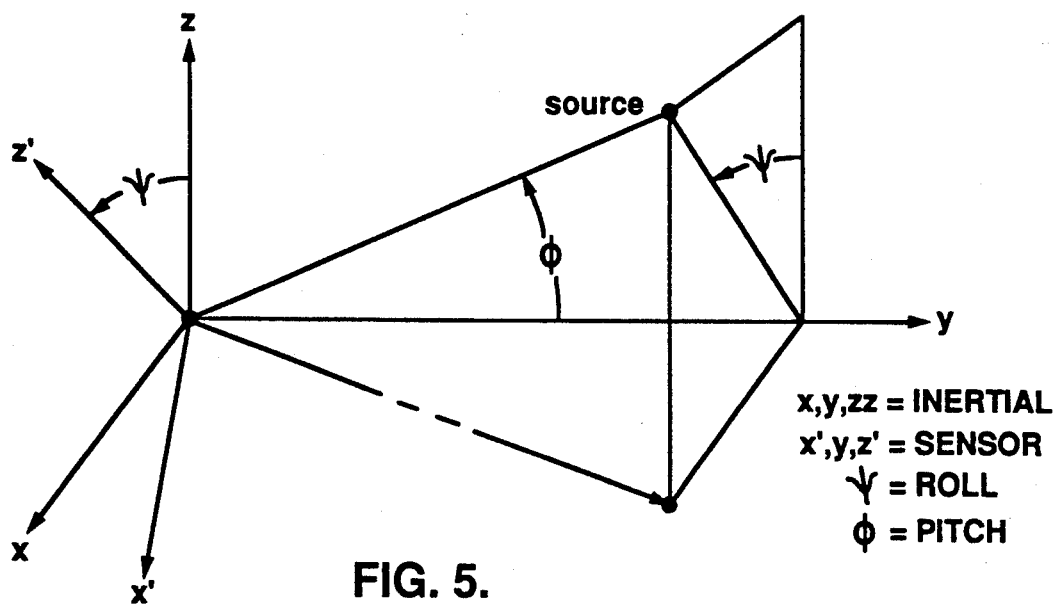
FIG. 5 shows the coordinate systems as applied to the radiation sensor optical elements of FIG. 3.

As shown best in FIG. 5, the coordinate system as applied to the radiation sensor and dome of FIG. 2 is seen to consist of a conventional XYZ set of orthogonal axes. The two planes of correction are essentially those in which "roll" takes place exemplified by the angle $\Psi$ and in the plane of so-called "pitch" exemplified by the angle $\phi$. In each case, Y represents the boresight of the sensor. More particularly, the inertial coordinate system consists of X, Y, Z whereas the coordinate system for the sensor is X', Y, Z'.

As will be more particularly described, the error correction means of the present invention is different for roll than for pitch. However, error correction in both the pitch and roll planes must be achieved in order to result in satisfactory correction that would enable the use of a dome having a surface other than a flat or spherical shape.

Returning to FIG. 1, a conventional curved dome 22 is seen to have a cross-sectional geometry that is symmetrical to the dome longitudinal axis and is constructed such that the outer and inner surfaces of the dome are parallel to one another in the region of a normal line drawn through the two surfaces (FIG. 2). However, when the principal ray 16 enters the dome material at an angle substantially skewed from the normal, it will leave the dome material at an internal surface 26 that is not parallel to the outer surface beam-entrance area. This lack of surface parallelism between the ray entrance and exit points on the dome is a major contributor to the radiation beam aberration sought to be corrected by the present invention.

With reference now to FIG. 3, a corrected dome 28 to remove the aberration and provide a correction in the pitch plane (Y, Z') is shown. The dome 28 has a smooth, curved, non-spherical outer surface designed primarily to reduce aerodynamic drag. For reasons that will be explained later, it is desirable that in cross-section the dome be axisymmetric (e.g., circular). More particularly, image distortion or refraction correction is provided by forming the interior surface 30 of the dome in such a way that the surface area at which a ray is emitted into the interior of the dome (e.g., area 31) is parallel to the surface area 33 at the point of principal ray incidence on the exterior surface. That is, there is, in effect, a shift of the inner surface with respect to the dome outer surface from that encountered in the conventional domes. With this modified dome interior surface, a principal ray passes into the dome interior along a line path substantially parallel to the ray path that would be followed by the principal ray if no dome were present. This change permits the dome inner surface to be circular in cross-section resulting in correction only having to be made for changes in the pitch angle $\phi$.

Since the dome 28 is axisymmetric, all principal rays coming from any forwardly located target at a given angular position about the dome longitudinal axis will be corrected in the same manner as described and to the same extent. For the ensuing description of that part of the invention for correcting aberrations in the roll plane, reference is made simultaneously to FIG. 4. As shown, the focusing reflector 18 is constructed of a piezo-electric plate 32 confined within an edge rim 34 and having a concavely curved front surface provided with a conductive reflective layer 36. On the back surface of the plate 32, there are affixed a plurality of spaced apart electrodes 38. A selective switching means 40 is interconnected with the electrodes 38, the reflective layer 36 and a voltage source 42.

In a way well known in the art, the switching means can be selectively actuated to establish a voltage connection to any one or all of the electrodes 38 to produce a corresponding change in the reflector curvature. By selecting the correct electrode or electrodes a curvature change can be obtained which will correct for an aberration in the roll plane. Selection of the correct electrode or combination of electrodes can be controlled by a digital processor 44 including stored correction values obtained from earlier calibration or test runs.

Alternatively, the processor 44 can be programmed to "dither" energization of the electrodes 38 and sensing sharpness of the image in different regions of a given scene enable implementing an adaptive scheme.

Although the described embodiments have been referenced for use in a missile guidance system, it is contemplated that the invention can be advantageously employed in any number of different situations where imaging is accomplished through a window whether or not the image is used for control purposes.

Although the invention has been described in connection with a preferred embodiment, it is to be understood that modifications may be made which will be within the spirit of the invention and the ambit of the appended claims. For example, an opto-refractive element could be used to achieve the correction provided by the modified focusing reflector 30.

What is claimed is:

1. An axisymmetric dome for correcting a refractive aberration of radiation received from an object on one side of the dome and detected by a radiation sensor located on the opposite side, comprising:

an arcuately formed platelike member symmetric about an axis along which the sensor is centered for receiving radiation and substantially transparent to the radiation, the surface area of the member closer to the object that receives a principal ray of the radiation being substantially parallel to the opposite member surface where the principal ray is emitted.

2. Apparatus to correct for image aberrations by a sensor located within a axisymmetric dome receiving radiation from an externally located object resulting from roll of the sensor and dome about the dome axis, comprising:

means within the dome for intercepting and reflecting the radiation onto the sensor; and means for selectively changing the reflective angle characteristics of different parts of said intercepting and reflecting means;

said intercepting and reflecting means including a deformable curved reflecting surface and a single continuous piezo-electric body adhered to a non-reflecting part of said reflecting surface.

3. Apparatus as in claim 2, in which the changing means includes at least one electrode conductively secured to the piezo-electric body, an electrical energy source, and switch means for selectively interconnecting the electrical energy source and the electrode.

4. Apparatus for correcting image distortion of an object detected by a sensor through an axisymmetric domelike window having an outer surface closer to the object and an inner surface closer to the sensor, comprising:

the window having a smoothly curved outer surface and a smoothly curved inner surface, said outer and inner surfaces being so formed that a principal ray from the object to the sensor is incident upon a window outer surface area portion and emitted from an inner surface area portion which portions are substantially parallel to one another;

curved reflector means for receiving at least the principal ray from the object after it passes through the window and focuses it onto the sensor; and means for selectively modifying the curvature of the reflector means to correct for roll movements of the sensor and domelike window.

5. Apparatus as in claim 4, in which the curved reflector means includes a curved plate of a piezo-electric material with an electrically conductive reflective material on a surface; and said curvature modifying means includes a plurality of electrodes positioned on the curved plate other surface, an electric power source, and selective switching means interconnecting the conductive reflective plate with one or more electrodes.

6. Apparatus as in claim 5, in which there is further provided a digital processor with stored data on reflector means curvature modification achieved for selected energization of any one or more electrodes, and a program provides a given electrode connection arrangement for a given angular displacement of the object about the domelike window axis.

* * * * *